W. T. CARTER.
ICE MAKING APPARATUS.
APPLICATION FILED MAR. 3, 1913.

1,130,960.

Patented Mar. 9, 1915.
3 SHEETS—SHEET 1.

WITNESSES:

INVENTOR
William T. Carter.
BY
ATTORNEY

W. T. CARTER.
ICE MAKING APPARATUS.
APPLICATION FILED MAR. 3, 1913.

1,130,960.

Patented Mar. 9, 1915.
3 SHEETS—SHEET 3.

WITNESSES:
Einar Larson

INVENTOR
William T. Carter.
BY
ATTORNEY

UNITED STATES PATENT OFFICE.

WILLIAM T. CARTER, OF CHICAGO, ILLINOIS.

ICE-MAKING APPARATUS.

1,130,960.　　　　Specification of Letters Patent.　　Patented Mar. 9, 1915.

Application filed March 3, 1913. Serial No. 751,787.

*To all whom it may concern:*

Be it known that I, WILLIAM T. CARTER, a citizen of the United States, residing at Chicago, in the county of Cook and State of Illinois, have invented certain new and useful Improvements in Ice-Making Apparatus, of which the following is a specification.

This invention relates to apparatus for making ice, and more particularly that type of apparatus in which the ice is formed in blocks of certain dimensions by the evaporation of liquid ammonia in a jacket surrounding a tank containing the water to be frozen.

The object of the invention is to dispense with the use of brine as the refrigerant medium; to allow clear and transparent ice to be made in small units or cakes, and to facilitate the removal of the latter from the apparatus without waste. This object is attained by a novel combination and arrangement of parts to be hereinafter described and claimed, reference being had to the accompanying drawings in which—

Figure 1:
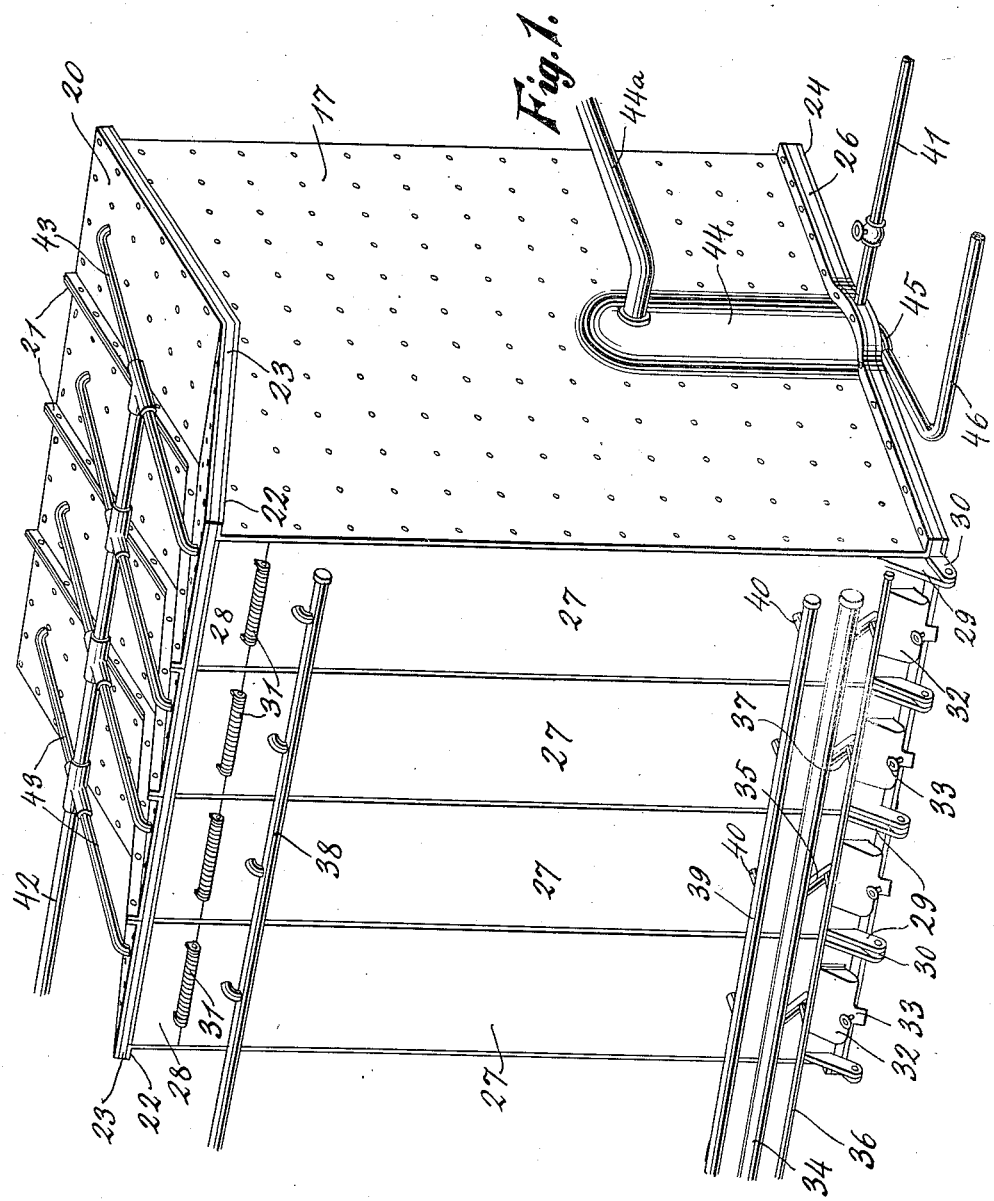
Figure 2:
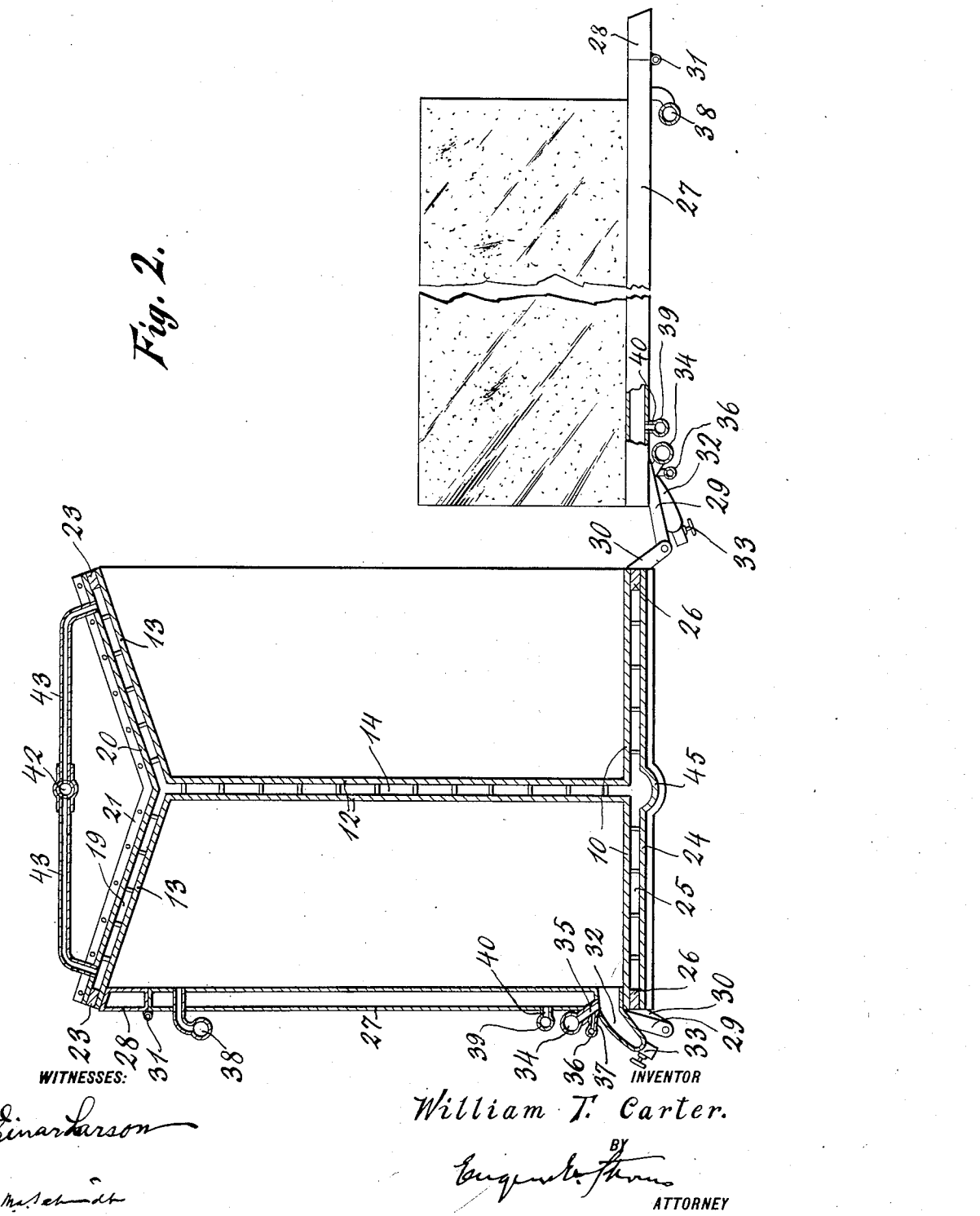
Figure 3:
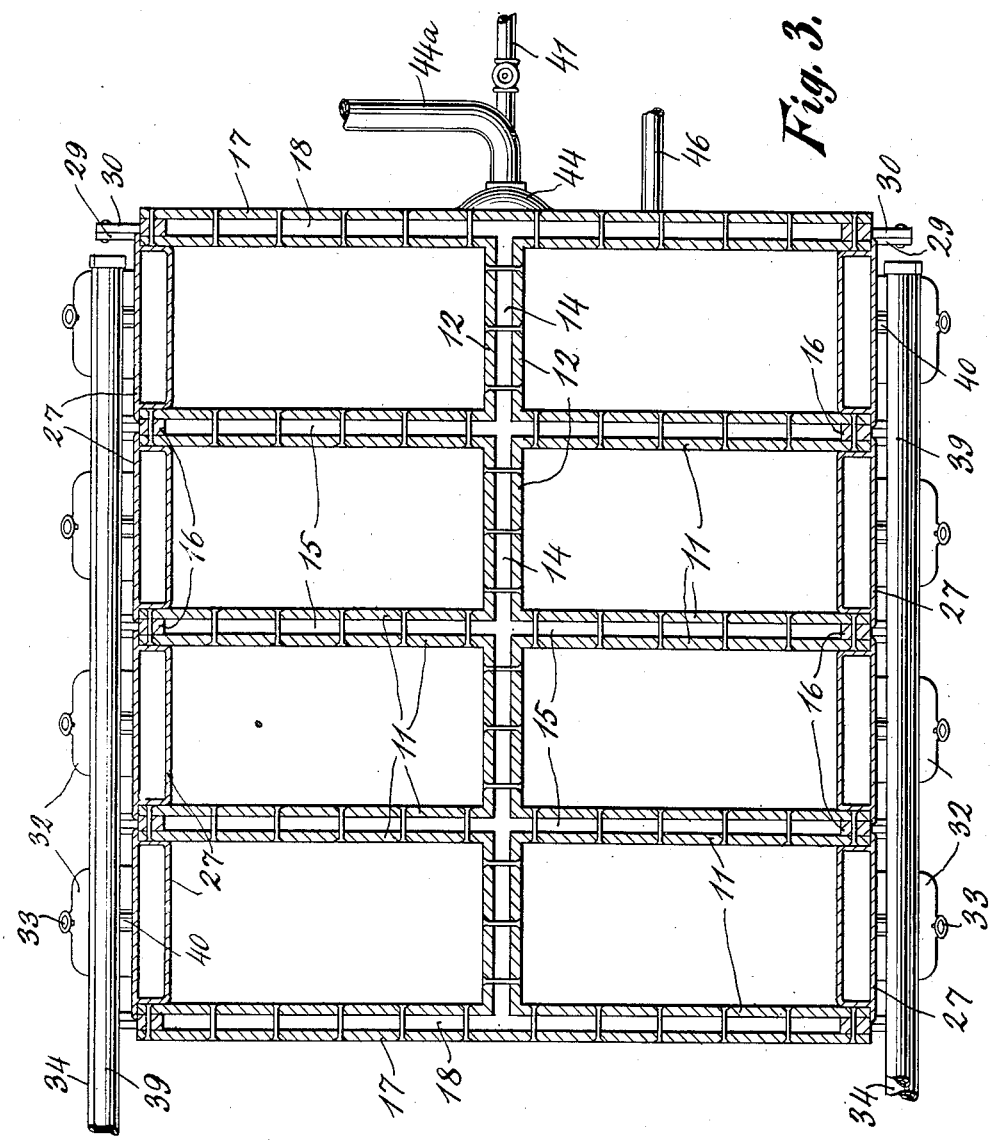

Figure 1 is a perspective view of the apparatus. Fig. 2 is a transverse section thereof, showing one of the doors swung open and supporting a block of ice. Fig. 3 is a horizontal section of the apparatus.

The drawings show the apparatus provided with eight freezing tanks arranged in sets of four placed abreast. Of course, the invention is not limited to any number of tanks and the same may be varied according to the desired capacity of the apparatus.

Each freezing tank comprises a bottom 10, opposite side walls 11, a rear wall 12 and a top 13, which latter slopes downward toward the rear wall. The two sets of four tanks are spaced apart so as to leave a narrow space 14 between the rear walls thereof. The tanks of each set are also spaced apart sidewise so as to leave a narrow space 15 between the side walls of adjacent tanks, which space opens at its inner end into the space 14. Vertical spacing strips 16 placed between said side walls of adjacent tanks, at their outer edges, and extending throughout the entire height thereof, close up the spaces 15 in front. Mounted at each end of the apparatus, in spaced relation with the outer walls of the end tanks of the sets, is an end wall 17 forming a narrow space 18 at the ends of the sets of tanks. A space 19 is also formed at the top of the tanks by top plates 20 which are also made slanting to correspond to the slant of the top 13 and are spaced therefrom. The plates 20 have abutting flanges 21, whereby they are riveted or otherwise securely fastened together. The end ones of the plates 20 meet the top of the walls 17 and are riveted or otherwise secured thereto, the latter having outstanding top flanges 22 for this purpose. Between the flanges 22 and the plates 20 is a spacing strip 23 which also extends between the plates 20 and the tops 13 of the tanks on both sides of the apparatus. This spacing strip therefore extends entirely around the apparatus and closes up the space 19 above the top of the tanks, and this space is in communication with the spaces 14 and 15, as well as with the spaces 18. The apparatus has a second bottom 24 which is spaced from the bottom 10 of the tanks, the space 25 thus formed being in communication with the spaces 14, 15 and 18. This bottom 24 is secured in the same manner as the top plates 20, and spacing strips 26, similar to the strips 23, are also employed.

It will be seen from the foregoing that the tanks, with the exception of their front portions, are each surrounded by a jacket so that the refrigerating medium may circulate around the same.

The front wall of each tank is in the form of a hollow door 27 hinged at the bottom and having at the top a short hinged section 28 which fits snugly against the sloping top 13 of the tank. The door has two hinge knuckles 29 at the bottom which are connected to corresponding knuckles 30 on the bottom 24. The upper section 28 of the door has a spring-hinge connection 31 therewith, the purpose of this hinged section being to allow access to the tank without opening the main door 27. The door has a waste-outlet pocket 32 at the bottom, the same being provided with a valve 33. The door is constructed to form a water-tight closure for the tank.

The doors on each side of the apparatus are all rigidly connected so that they swing together. This connection is made by the system of pipes which will now be described: A pipe 34 leads from a main or other source of water supply. This pipe extends horizontally in front of the doors near the bottom thereof, and has branches 35 passing through the doors and discharging into the respective tanks, whereby the latter are filled with the water to be frozen. A pipe 36 leading from a suitable source of compressed air, has branches 37 opening, respectively, into the branches 35. An overflow pipe 38 is also provided, the branches of the same passing through the door near the top thereof so that the water will not exceed a predetermined level in the tanks. This pipe may lead back to the feed water supply. A hot water pipe 39 is connected by branches 40 with the hollow space in each door for a purpose to be presently described.

The piping for controlling the refrigerant in the jacket surrounding the tanks is arranged as follows: A pipe 41 leading from the liquid ammonia source discharges into the space 25. A pipe 42 connected to the suction side of the pump has branches 43 which open into the space 19 at the top of the tanks. One of the end plates 20 has a bulge 44 to which a pipe 44ª, for a purpose to be presently described, is connected. At the longitudinal center of the bottom 24 is a gutter 45 serving as a drain from which a pipe 46 leads.

The apparatus operates as follows: The doors 27 being closed, cold water is admitted into the tanks from the pipe 34, the rise of water in the tanks being limited by the overflow pipe 38. Compressed air is also discharged into the tanks with the entering water through the branches 37, to keep the water agitated. A pump (not shown) connected to the overflow keeps the water in circulation, which, together with the agitation set up by the air, results in the formation of blocks of clear, transparent ice. Liquid ammonia is discharged by the pipe 41 into the jacket space surrounding the tanks, in which space it vaporizes, and the vapors are withdrawn by the pump through the pipe 42. The water in the tanks will now freeze, the ice starting to form at the walls which are surrounded by the jacket containing the refrigerant. The water freezes across the tanks forward the doors 27, so that there will be a constantly diminishing space next to the doors for the water to circulate upward, this being due to the fact that the doors are not exposed to the refrigerant. When the blocks of ice are complete, which may be seen by opening the door sections 28, hot ammonia gas is allowed to enter the refrigerant space or jacket from the pipe 44ª. This will melt the sides of the blocks which cling to the walls of the tanks, but not that side of the blocks which adheres to the doors. The doors may now be swung open taking the adhering blocks with them. The slant of the top of the tanks allows the blocks to be swung out with the doors, the blocks clearing the top. The doors are swung down into horizontal position, and hot water from the pipe 39 is turned into the interior of the doors so that the adhering blocks will be thawed off for removal.

The pipes connected to the doors have suitable flexible connections so as not to interfere with the swing of the doors. The inner surfaces of the tanks are galvanized to prevent rust.

As the expansion of the liquid ammonia produces considerable pressure, the walls of the tanks are connected by stay bolts 47.

I claim:

1. In an ice-making apparatus, a freezing tank having a swinging door forming one of the walls thereof, to which door the finished block of ice adheres, said door being hollow and having a hinged section at the top, and means for introducing a heating medium into the hollow of the door.

2. In an ice-making apparatus, a freezing tank having a sloping top, and a hollow door forming one of the walls of the tank, said door being hinged at the bottom to swing downward and outward and closing aaginst the sloping top, and means for introducing a heating medium into the hollow of the door.

3. In an ice-making apparatus, a freezing tank surrounded by a refrigerant jacket, and having a swinging closure which is hollow, means for introducing a heating medium into the jacket and the hollow of the closure, and water inlets to the tank through the closure.

4. In an ice-making apparatus, a freezing tank surrounded by a refrigerant jacket, and having a swinging hollow closure to which the finished block of ice adheres, means for introducing a heating medium into the jacket to thaw the block off the tank walls and permit the closure to be swung open, and means for introducing a heating medium into the hollow of the closure to thaw the block off the same.

In testimony whereof I affix my signature in presence of two witnesses.

WILLIAM T. CARTER.

Witnesses:
S. J. LEHRER,
H. G. BATCHELOR.